United States Patent
Shimamura et al.

(10) Patent No.: US 10,268,183 B2
(45) Date of Patent: Apr. 23, 2019

(54) CONTROL DEVICE AND METHOD OF SYNCHRONIZING CONTROL

(71) Applicant: OMRON Corporation, Kyoto-shi, Kyoto (JP)

(72) Inventors: Junji Shimamura, Takatsuki (JP); Toshiaki Kato, Izunokuni (JP); Yosuke Iwai, Kusatsu (JP); Tomonori Shimamura, Ohtsu (JP); Eiji Yamamoto, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 306 days.

(21) Appl. No.: 15/057,258

(22) Filed: Mar. 1, 2016

(65) Prior Publication Data

US 2016/0259311 A1     Sep. 8, 2016

(30) Foreign Application Priority Data

Mar. 4, 2015   (JP) .................................. 2015-043011
Feb. 15, 2016  (JP) .................................. 2016-026309

(51) Int. Cl.
     *G05B 19/416*     (2006.01)
(52) U.S. Cl.
     CPC .. *G05B 19/416* (2013.01); *G05B 2219/50234* (2013.01)
(58) Field of Classification Search
     CPC ..................... G05B 19/416; G05B 2219/50234
     See application file for complete search history.

(56) References Cited

U.S. PATENT DOCUMENTS

| 3,947,667 | A | * | 3/1976 | Parker | G05B 19/4103 318/572 |
| 5,625,267 | A | * | 4/1997 | Gregory | G05B 19/416 318/35 |
| 5,768,122 | A | * | 6/1998 | Motoc | B25J 9/1664 700/18 |
| 5,832,188 | A | * | 11/1998 | Papiernik | G05B 19/416 700/245 |
| 6,625,498 | B1 | | 9/2003 | Kurakake et al. | |

(Continued)

FOREIGN PATENT DOCUMENTS

| CN | 102306011 A | 1/2012 |
| EP | 0943973 A1 | 9/1999 |

(Continued)

OTHER PUBLICATIONS

The office action (JPOA) dated Aug. 21, 2018 in a counterpart Japanese patent application.

(Continued)

*Primary Examiner* — Michael Jung
(74) *Attorney, Agent, or Firm* — Metrolexis Law Group, PLLC

(57) ABSTRACT

A control device is configured to synchronize a second axis with a (real or virtual) first axis. The control device includes a processor configured to use position information for the first axis to compute a position command for the second axis, and to correct the position command when outputting a position command to the second axis to compensate for a delay caused by the transmission of the position command from the control device to the second axis, and a delay on the second axis.

20 Claims, 16 Drawing Sheets

(56) References Cited

U.S. PATENT DOCUMENTS

| | | | |
|---|---|---|---|
| 2002/0103567 A1* | 8/2002 | Hishikawa | G05B 19/416 700/170 |
| 2007/0013334 A1 | 1/2007 | Wirtz et al. | |
| 2009/0009126 A1* | 1/2009 | Hishikawa | G05B 19/416 318/600 |
| 2011/0077926 A1* | 3/2011 | Amthor | G05B 19/4069 703/6 |
| 2013/0002185 A1* | 1/2013 | Hosomi | G05B 19/416 318/625 |
| 2013/0033218 A1* | 2/2013 | Yamada | G05B 19/06 318/567 |
| 2013/0134919 A1* | 5/2013 | Takayama | G05B 19/416 318/625 |
| 2014/0249672 A1* | 9/2014 | Narui | G05B 19/05 700/245 |
| 2014/0364964 A1* | 12/2014 | Suematsu | G05B 19/0426 700/17 |
| 2015/0168940 A1* | 6/2015 | Geweth | G05B 19/19 700/61 |
| 2015/0355633 A1* | 12/2015 | Nagatani | G05B 19/4155 700/275 |
| 2016/0197778 A1* | 7/2016 | Jones | G05B 19/056 709/222 |

FOREIGN PATENT DOCUMENTS

| | | |
|---|---|---|
| EP | 1052560 A1 | 11/2000 |
| EP | 1729192 A2 | 12/2006 |
| JP | H02-095189 A | 4/1990 |
| JP | H08-126375 A | 5/1996 |
| JP | 2001-027904 A | 1/2001 |
| JP | 2014-119902 A | 6/2014 |
| JP | 2014-119904 A | 6/2014 |
| WO | 2013102338 A1 | 7/2013 |

OTHER PUBLICATIONS

The Chinese Office Action dated May 16, 2018 in a counterpart Chinese patent application.

* cited by examiner

CONTROL DEVICE AND METHOD OF SYNCHRONIZING CONTROL

FIELD

The present invention relates to a synchronizing control device.

BACKGROUND

When motion control synchronizes a first axis and a second axis, the information measured on the first axis is processed and transmitted to the second axis, and the delay between the measurement, processing, and transmission of the information from the first axis may create a synchronization lag between the first axis and the second axis. Patent Document 1, Japanese Unexamined Patent Application Publication No. 2014-119904 (published 30 Jun. 2014) discloses a method of using a filter to shift the first axis position measured to compensate for the synchronization lag.

REFERENCES

Patent Documents

[Patent Document 1] Japanese Unexamined Patent Application Publication No. 2014-119904 (published 30 Jun. 2014)

Technical Problem

Merely taking into account the delay due to information transmission, like in the above-described method, is inadequate for implementing highly precise motion control.

SUMMARY

A control device according to embodiments of the invention synchronizes a second axis to a first axis; the control device is provided with a processor configured to use position information for the first axis to compute a position command for the second axis, and to correct the position command when outputting a position command to the second axis to compensate for a delay caused by the transmission of the position command from the control device to the second axis and a delay on the second axis.

Note that the first axis is not necessarily a real object, and may be a virtual axis realized through processing carried out by the processor.

Effects

The aforementioned configuration is capable of suppressing the synchronization lag due to a delay caused by the aforementioned transmission of the position command, and a delay on the second axis in a motion control system that synchronizes a first axis and a second axis.

DETAILED DESCRIPTION

Figure 1A:
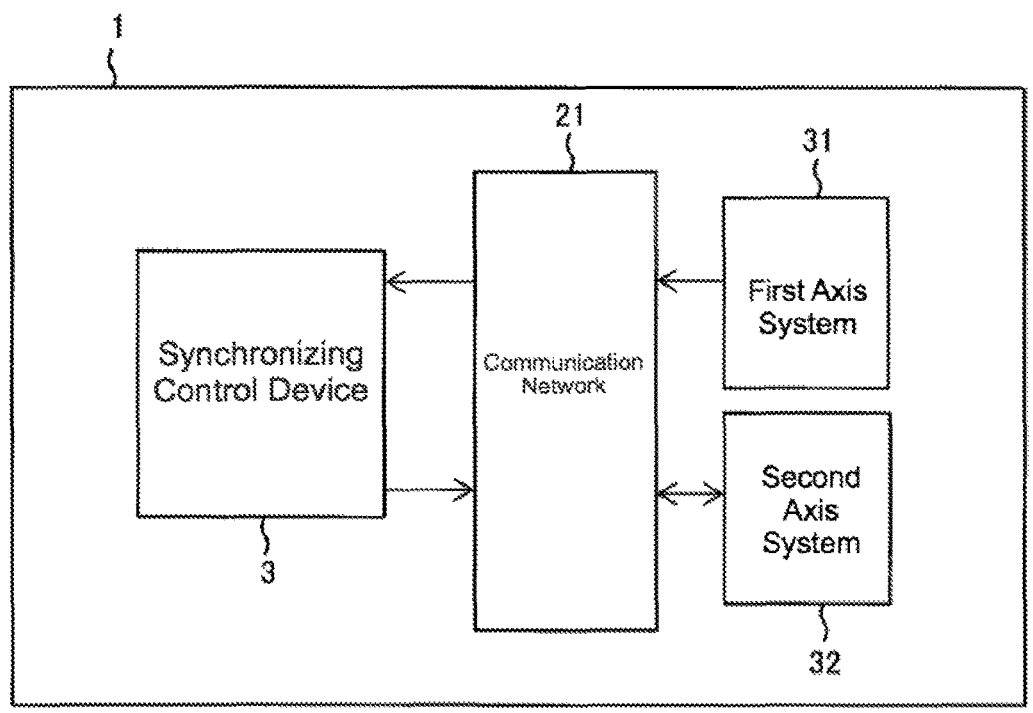
FIG. 1A is a block diagram illustrating an overall configuration of a motion control system according to a first embodiment.

The motion control system 1 illustrated in FIG. 1A is provided with a synchronizing control device 3, a communication network 21, a first axis system 31, and a second axis system 32. The synchronizing control device 3 may be a programmable logic controller (PLC).

The synchronizing control device 3 is provided with a processor that periodically computes a position command for the second axis system 32 using position information for the first axis system 31, and provides an output corresponding to the second axis system 32 position command (e.g., by transmitting a second-axis position signal) to thereby synchronize the second axis system 32 with the first axis system 31.

Figure 1B:
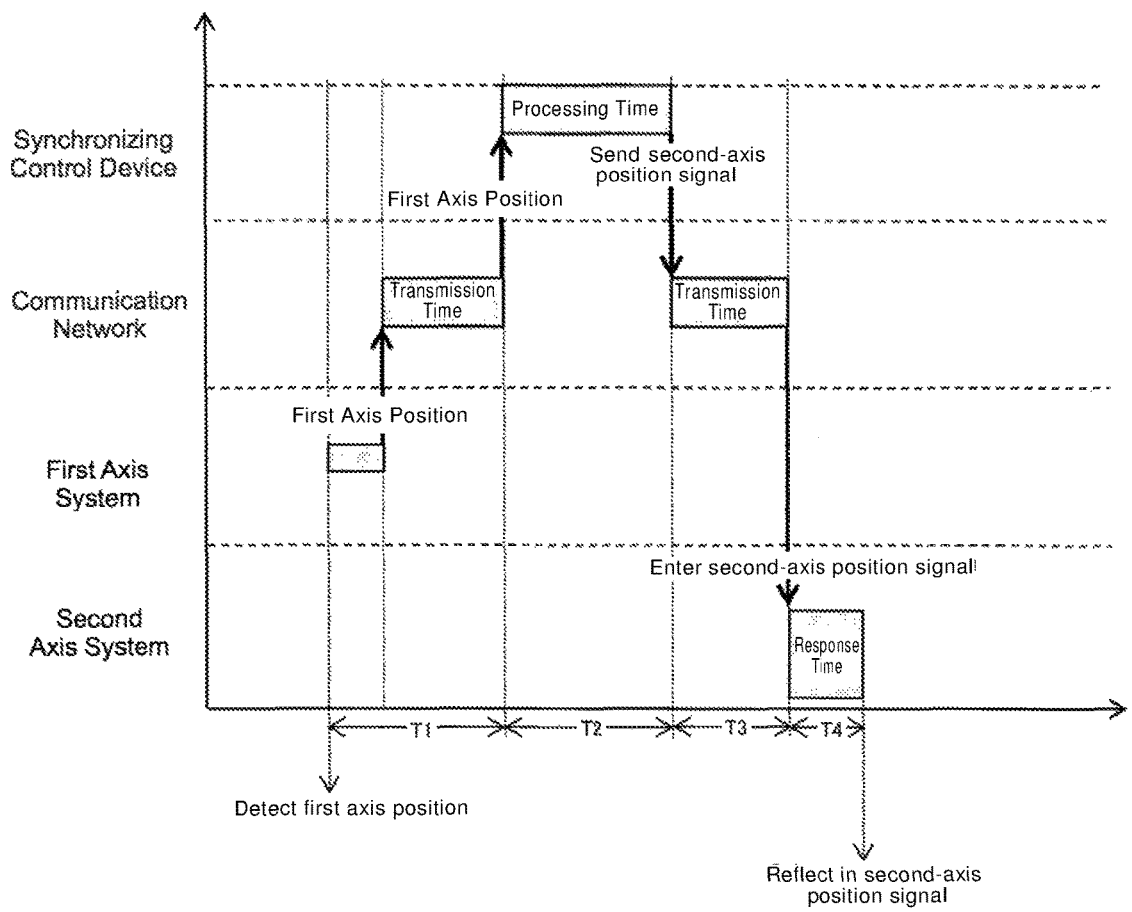
FIG. 1B is a timing chart for explaining the cause for a synchronization lag.

As illustrated in FIG. 1B, the time T1 needed from detecting the first axis position to entering the first axis position in the synchronizing control device 3 via the communication network 21, the time T2 needed from the processor in the synchronizing control device 3 receiving the first axis position until the processor outputs a position command corresponding thereto (for instance, transmitting a second-axis position signal), the time T3 needed to enter the output into the second axis system 32 via the communication network 21, and the time T4 indicating the delay on the second axis system 32 each generate a synchronization lag in the motion control system 1.

The delay time T4 on the second axis is generated from a response delay due to, for example, the processing time of a servo driver, and friction and the like acting on the servo motor and the second axis system; for instance, the time T4 can indicate the time taken from the second axis system 32 receives the second-axis position signal via the communication network 21 until this signal is converted to an electrical signal and the value changes in the encoder installed in a servo motor (later described) in the second axis system.

The synchronization lag created due to the time T1 through time T4 in the synchronizing control device 3 may be compensated for as follows. Note that time T1+time T2 is the delay on the first axis, while time T3+time T4 is the delay on the second axis.

First Embodiment

The first embodiment compensates for the synchronization lag due to the delay on the first axis (T1+T2), and the synchronization lag due to the delay on the second axis (T3+T4) separately.

Figure 2:
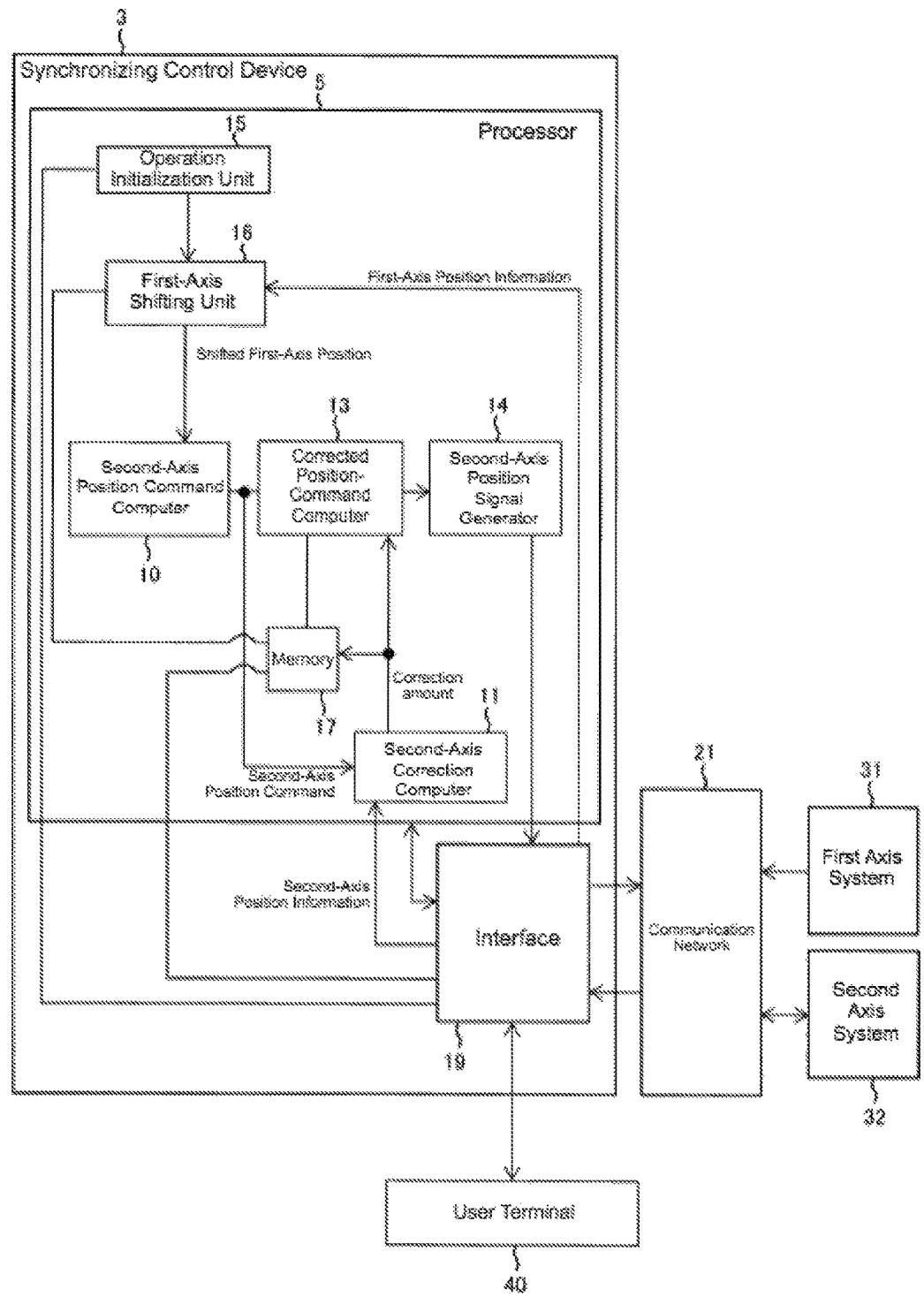
FIG. 2 is a block diagram illustrating a configuration of the motion control system according to the first embodiment.

As illustrated in FIG. 2, the motion control system according to the first embodiment is provided with a synchronizing control device 3 which contains a processor 5 and an interface 19, a communication network 21, e.g., EtherCAT (Registered Trademark), a first axis system 31, and a second axis system 32; the synchronizing control device 3 is connected to a user terminal 40 (information processing device).

Figure 3A:
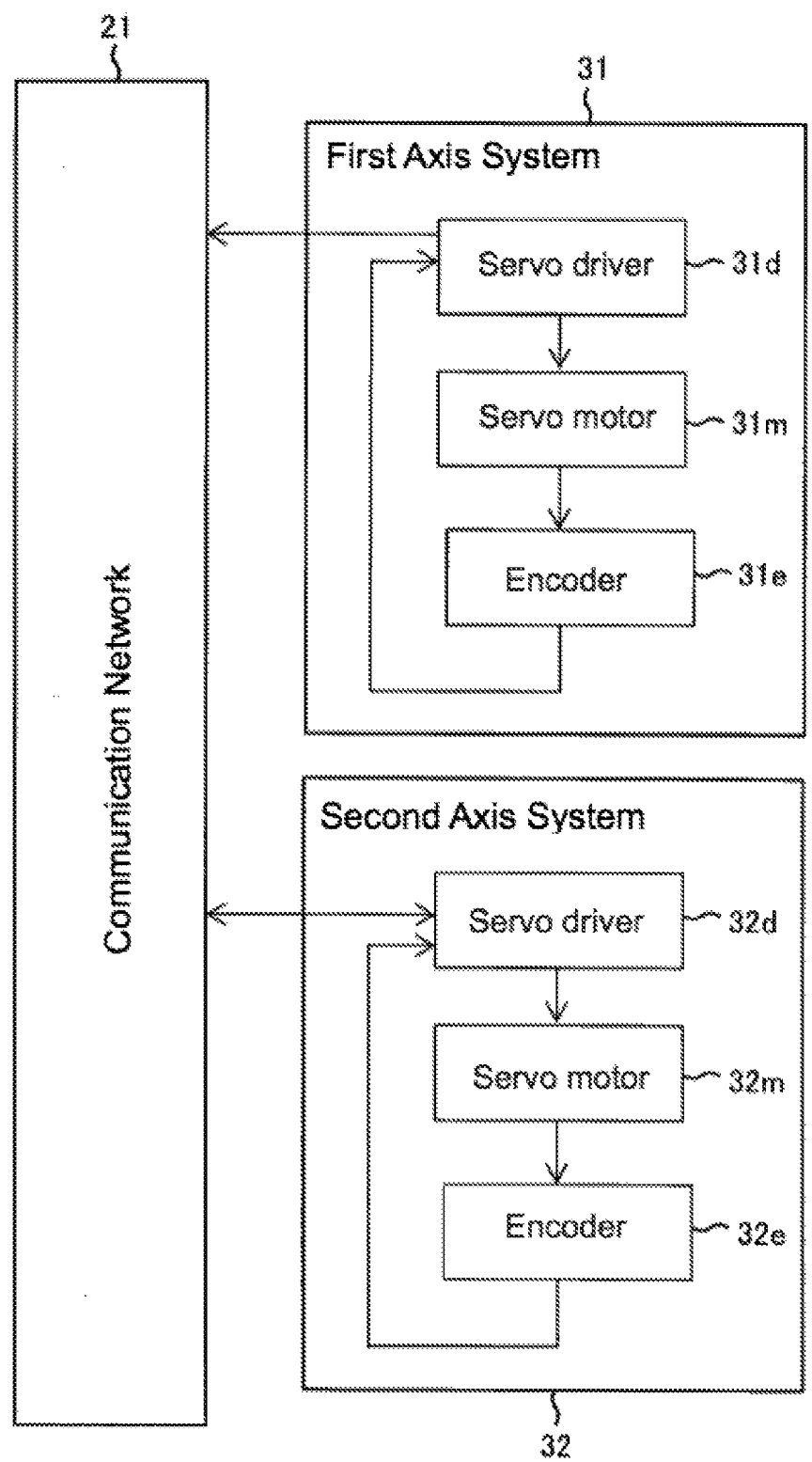
FIG. 3A is a block diagram illustrating a configuration of a first axis system and a second axis system.

Here, as illustrated in FIG. 3A, the first axis system 31 contains a servo driver 31d, a servo motor 31m that serves as the first axis, and an encoder 31e (signal generator); the servo driver 31d drives the servo motor 31m, and the encoder 31e transmits a signal representing the position of the servo motor 31m to the communication network 21. In addition, the second axis system 32 contains a servo driver 32d, a servo motor 32m that serves as the second axis, and an encoder 32e (signal generator); the servo driver 32d drives the servo motor 32m, and the encoder 32e transmits a signal representing the position of the servo motor 32m to the communication network 21.

Figure 3B:
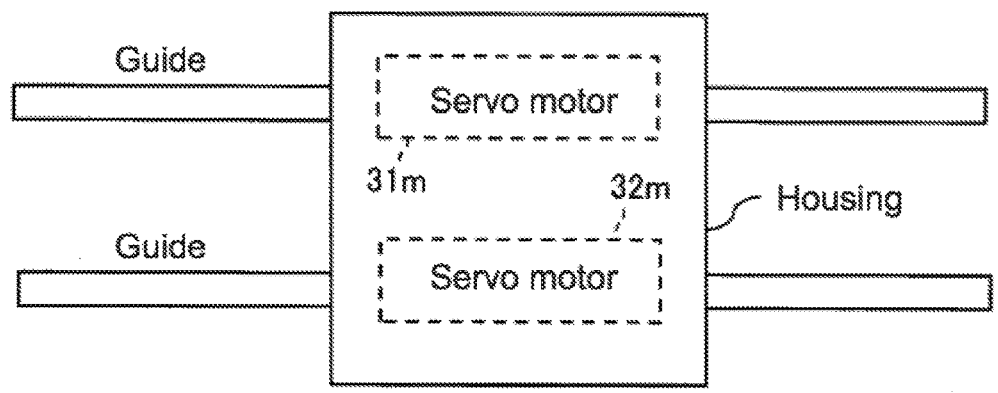
FIG. 3B is a schematic diagram of a gantry mechanism related to the block diagram in FIG. 3A.

Note that as illustrated in FIG. 3B, the servo motor 31m in the first axis system 31, and the servo motor 32m in the second axis system 32 are mechanically secured by the same housing; the two servo motors 31m, 32m which are the first axis and the second axis are coordinated on guides for parallel movement (gantry mechanism).

Returning to FIG. 2, the processor 5 contains a memory 17, and also includes: a second-axis position-command computer 10, a second-axis correction computer 11, a corrected position-command computer 13, a second-axis position signal generator 14, an operation initialization unit 15, and a first-axis shifting unit 16 as function blocks. In other words, the processor 5 implements each of these functions by executing a motion control program.

The first axis system 31 and the second axis system 32 are each connected to the processor 19 via the communication network 21 and the interface 19. The user terminal 40 is connected to the processor 5 via the interface 19.

The first axis system 31 transmits first-axis position information (i.e. angles and distances based on pulse signals from the encoder 31e) to the first-axis shifting unit 16 via the communication network 21 and the interface 19. The second axis system 32 transmits second-axis position information (i.e., angles and distances corresponding to pulse signals from the encoder 32e) to the second-axis correction computer 11 via the communication network 21 and the interface 19.

The first-axis shifting unit 16 uses the first-axis position information, the time T1[N] and prep time T2[N] during a control cycle N to compute a first-axis shift amount (the travel distance of the first axis between T1[N]+T2[N]), using, for example the first-axis speed Vm[N] during the control cycle N as illustrated in Formula 1.

First-axis Shift Amount [N]=Vm[N]×(T1[N]+T2[N])    Formula 1

Alternatively, the first-axis shift amount can be computed, for instance, using the average acceleration Am[N] of the first axis as illustrated by Formula 2.

First-axis Shift Amount [N]=Am[N]×(T1[N]+T2[N])²/2    Formula 2

Here, the first-axis position is shifted by exactly the first-axis shift amount in the advancing direction to obtain the shifted first-axis position.

Note that, "first-axis shift amount [N]" indicates the first-axis shift amount during the control cycle N; the values of Vm[N], T1[N], and T2[N] are all related to the control cycle N.

The second-axis position-command computer 10 uses the shifted first-axis position, and the first-axis position information to compute a second-axis position command. For instance, when the computation protocol for establishing synchronization uses gear movement, the second-axis position command during the control cycle N can be obtained from Formula 3 using a gear ratio G.

Second-axis Position Command [N]=Second-axis Position Command [N−1]+G×(Shifted First-axis Position [N]−Shifted First-axis Position [N−1])    Formula 3

Thus, the synchronization lag due to a delay on the first axis (T1 [N]+T2[N]) during the control cycle N can be compensated for in this manner by using the shifted first-axis position.

The second-axis direction computer 11 uses a second-axis speed command Vs[N] for a control cycle N computed from the second-axis position command, and the time T3 and the time T4 to compute a correction amount (i.e., a travel distance for the second axis between T3[N]+T4[N]) during the control cycle N using, for instance, Formula 4.

Second-axis Correction Amount [N]=Vs[N]×(T3[N]+T4[N])    Formula 4

Alternatively, a second-axis acceleration command As[N] can be calculated for the control cycle [N].

Second-axis Correction Amount [N]=As[N]×(T3[N]+T4[N])²/2    Formula 5

The corrected position-command computer 13 back tracks the second-axis position command by the correction amount, setting that position as the corrected position command; the corrected position-command computer 13 inputs the corrected position command into the second-axis position signal generator 14, and notifies the memory 17 and the user program on the user terminal 40 of the correction amount and the corrected position command.

The second-axis position signal generator 14 uses the corrected position command and the second-axis position information to generate a second-axis position signal.

Here, when the speed based on the second-axis position signal is less than the maximum speed on the second axis, this second-axis position signal is entered (transmitted) to the second axis system 32 via the interface 19 and the communication network 21. The second-axis position signal is reflected in the second axis system a time T4 after entering the second axis system 32.

When the speed based on the second-axis position signal exceeds the maximum speed of the second axis, the processor further determines whether or not the residual travel distance that remains even when the second axis travels at the maximum speed is within a defined amount; if within the defined amount the processor resets the second-axis position signal to a value based on the maximum speed and inputs the value into the second axis system 32. In this case the residual travel distance is forwarded to a subsequent cycle. Note that if the residual travel distance is a defined amount or greater, the processor determines that there was a malfunction and stops the operation on the second axis system 32.

Thus, the processor back tracks the second-axis position command by the correction amount to compute the corrected position command, and the synchronizing control device compensates for the synchronization lag due to the delay on the second axis (T3+T4) in this manner by inputting a second-axis position signal based on the corrected position command into the second axis system 32.

Figure 10:
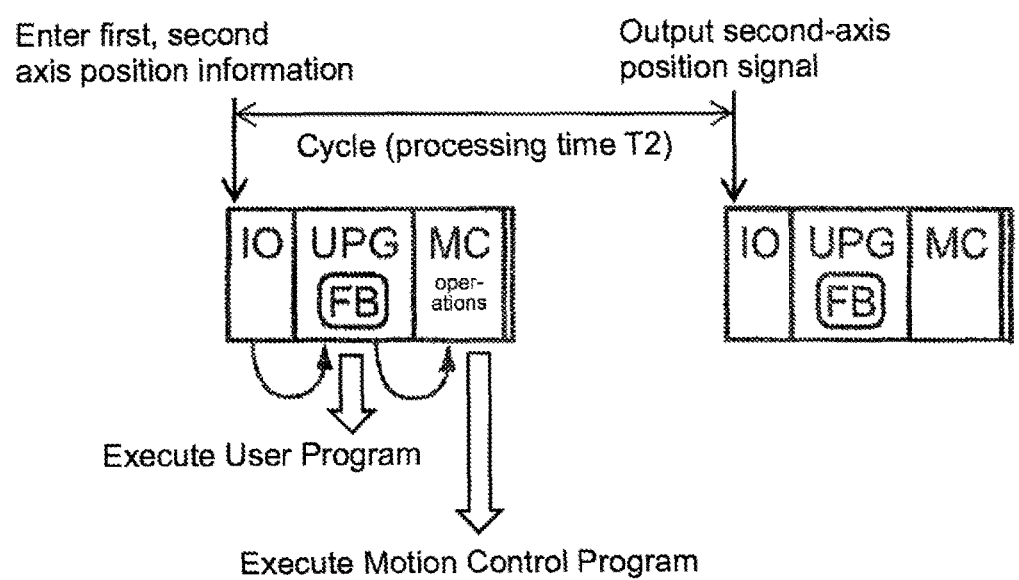
FIG. 10 is a diagram for explaining the processing procedures executed by the processor.

As illustrated in FIG. 10, the time T2 represents the processing cycle in the processor. The processor 5 first acquires position information and the like from the first axis and the second axis during an I/O period, executes a user program and runs motion control commands FB during a UPG period (the output variables from the motion control commands are updated at this time), executes motion computations using the motion control program in accordance with the motion control commands FB and generates instructions such as the second-axis position signal during an MC period, and outputs (sends) the second-axis position signal during the I/O period in the next cycle.

The second axis correction amount may be carried out during the MC computations illustrated in FIG. 10. A user may utilize the function blocks (FB) illustrated in FIG. 10 to correct the delay on the second axis; however, FIG. 11A depicts an implementation of the function blocks in this case.

Figure 11A:
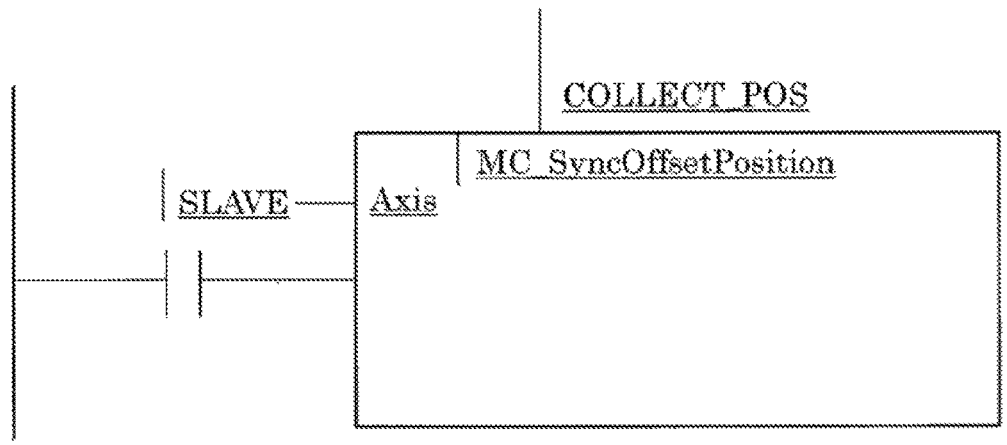
FIGS. 11A and 11B illustrate examples of a program used in the embodiment.

FIG. 11A illustrates one example of a user program that can be run on a control device according to the embodiment. As illustrated in FIG. 11A, the user program is defined in the form of a ladder program and includes a function block FB. The function block FB includes commands for specifying the supporting library program (or, code corresponding to the library program) that is called and executed when the execution sequence arrives at the function block FB. In other words, a library program, which is the program content corresponding to the function block is prepared in advance, and the processor calls and executes the library program as appropriate in accordance with the program. Here, only an axis variable for the second axis, e.g., a position command for the second axis which is included as a member variable in the data structure, is specified as an input to the function block. The second-axis correction amount is computed with internal processes in the function block, or MC computations directed through the execution contents of the function block.

Figure 11B:
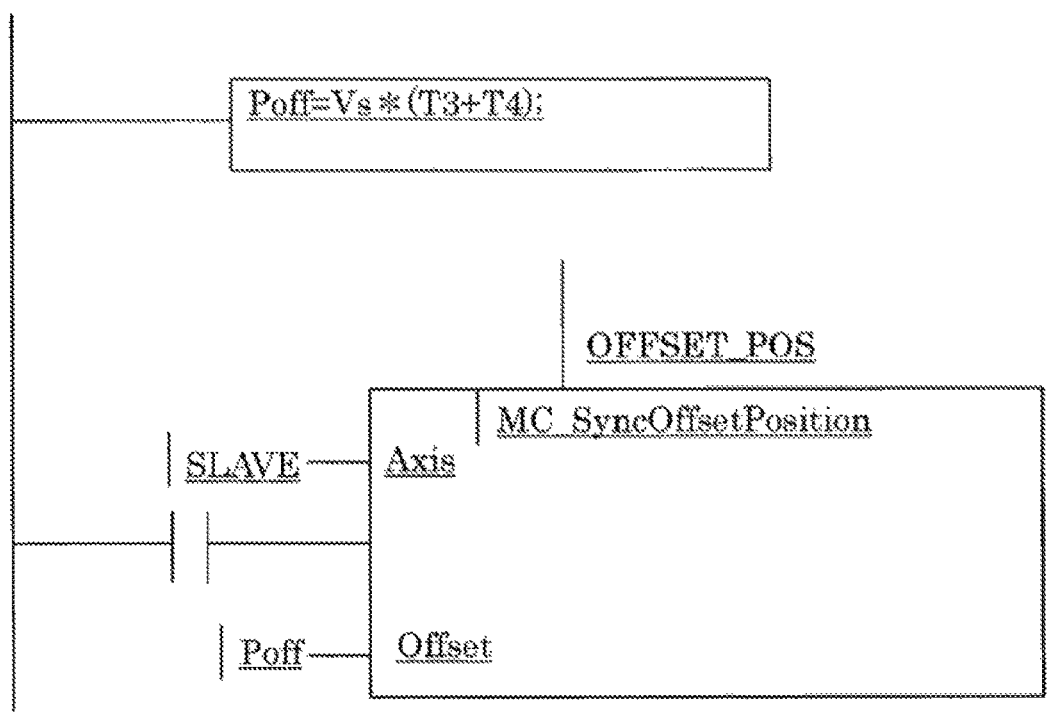

Additionally, the second-axis correction amount may be computed with the user program (UPG) presented in FIG. 10. In this case, the position command for the second axis, and the second-axis correction amount are specified as input values in the function block illustrated in FIG. 11B. The axis variable and the second-axis correction amount are specified as input for the function block after correcting the second-axis position command and before executing the function block.

Note that to measure the times T1 to T4, should the procedure described in Japanese Utility Patent No. 4894961 be used, a transmission through the communication circuit can be performed within a fixed control cycle; therefore, the delay during T1 to T3 can be calculated from the control cycle used by the communication circuit. Moreover, T4 can be identified by a change in the second-axis encoder when commands to second axis are provided as stepped output.

Given that the previous correction amount and corrected position command are saved in the memory 17, the second axis system 32 can stay at the most recent corrected position command even if output of the second-axis position signal is forcibly stopped for some reason. The user can also monitor the correction amount and the corrected position command sent to the user program during each cycle.

When a synchronization operation starts, the operation initialization unit 15 determines whether the second axis system 32 should operate using the most recent corrected position command, or should operate using the most recent uncorrected second-axis position command in accordance with a default setting or user input.

The operation initialization unit 15 further determines which positioned command is being used by the second axis system when the second axis system 32 begins operations; if there is a malfunction the operation initialization unit 15 provides external notification to that effect and does not initiate operation of the second axis system 32. Finally the operation initialization unit 15 resets the correction amount stored in the memory 17 to zero when the second axis system 32 starts operations besides synchronizing with the first axis system 31.

Figure 4:
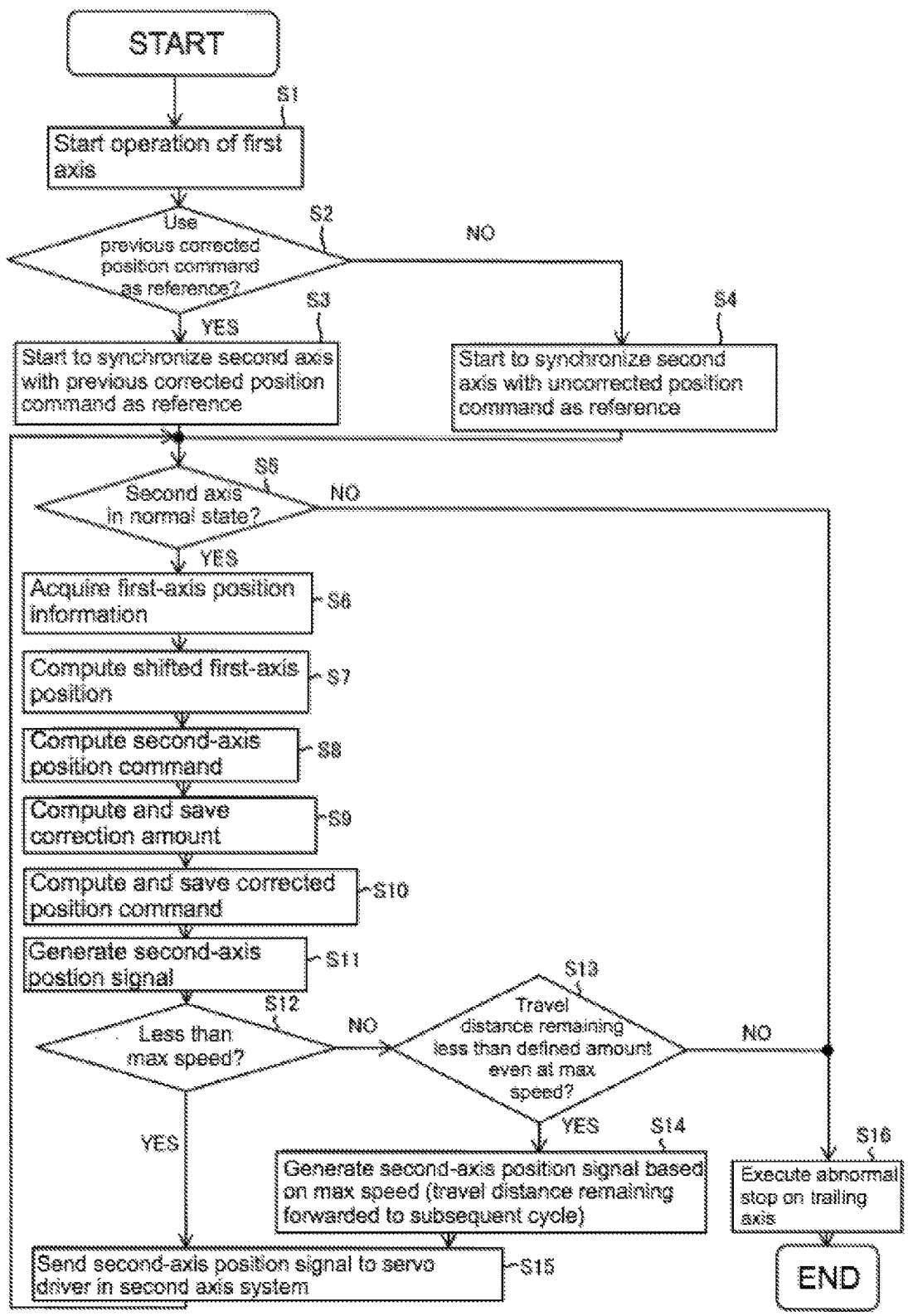
FIG. 4 is a flowchart illustrating the processing steps executed in the processor in FIGS. 3A and 3B.

The flow chart in FIG. 4 illustrates the processing steps executed in the above-described processor 5. On execution of the motion control program the processor 5 executes the following processes.

First, the processor starts the operations on the first axis in step S1; in step S2 the processor determines whether or not the operation of the second axis system 32 should be executed based on the previous corrected position command. If YES in step S2, the processor starts operations on the second axis based on the previous corrected position command (step S3). If NO in step S2, the processor starts operations on the second axis based on the previous uncorrected position command (step S4).

Control proceeds to step S5, and the processor determines whether or not the second axis is in a normal state. If NO at step S5, control proceeds to step S16 and the second axis is placed in an abnormal stop (END). If YES at step S5, the processor acquires the first-axis position information (step S6).

Subsequently, the processor computes the shifted first-axis position (step S7). Next, the processor computes the second-axis position command (step S8). The processor then computes and saves the correction amount (step S9). The processor then computes and saves the corrected position command (step S10).

Subsequently the processor generates a second-axis position signal (step S11). Next, the processor determines whether or not the maximum speed is exceeded in step S12, if the determination is YES at step S12, the processor sends the second-axis position signal to the servo driver on the second axis (S15). If NO at S12, the processor further determines whether or not the excess travel distance is less than a defined amount (step S13). If NO at step S13, control proceeds to step S16 and the second axis is placed in an abnormal stop (END). If YES at step S13, control proceeds to step S14 where the processor resets the second-axis position signal to a value based on the maximum speed (with the excess travel distance forwarded to the subsequent cycle), and sends the reset second-axis position signal to the servo driver in the second axis system 32 (step S15).

Figure 5A:
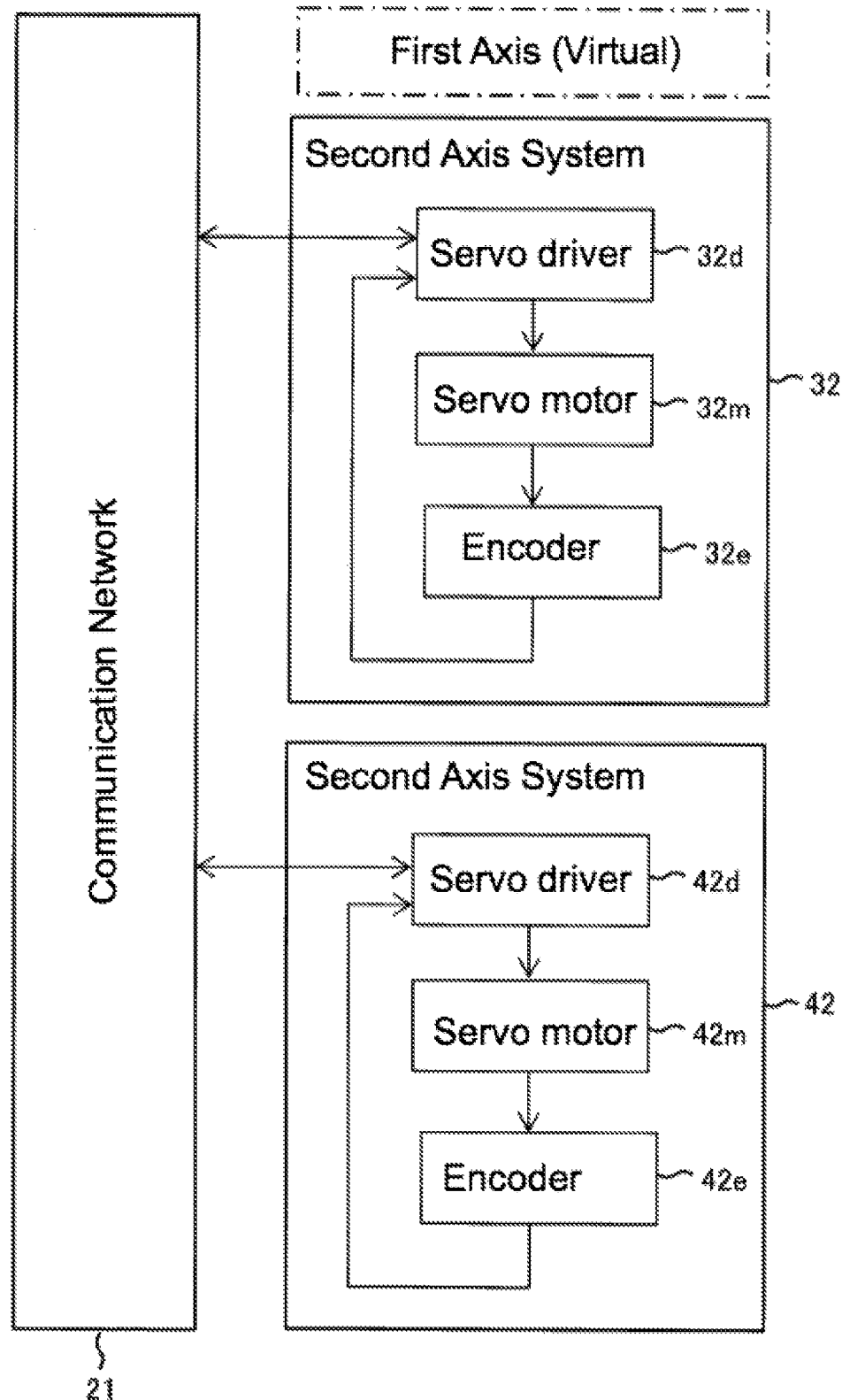
FIG. 5A is a block diagram illustrating a configuration of a first axis system and a second axis system in the first embodiment.

The above explanation was made on the assumption that the first axis system is a real object, however the embodiments are not limited thereto. The first axis may be a virtual object (a virtual first axis created by the processor 5) as illustrated in FIG. 5A. Namely, the second axis system 32 contains a servo driver 32d, a servo motor 32m (second axis), and an encoder 32e (signal generator), and the second axis system 42 contains a servo driver 42d, a servo motor 42m (second axis), and an encoder 42e (signal generator);

the servo motor 32*m* in the second axis system 32, and the servo motor 42*m* in the second axis system 42 are mechanically secured by the same housing, with the servo motors 32*m*, 42*m* coordinated on guides for parallel movement (gantry mechanism).

In this case shifting the first axis position is unnecessary; therefore step S7 (FIG. 4) is executed in the first-axis shifting unit 16 with the first-axis shift amount set to zero.

Figure 6:
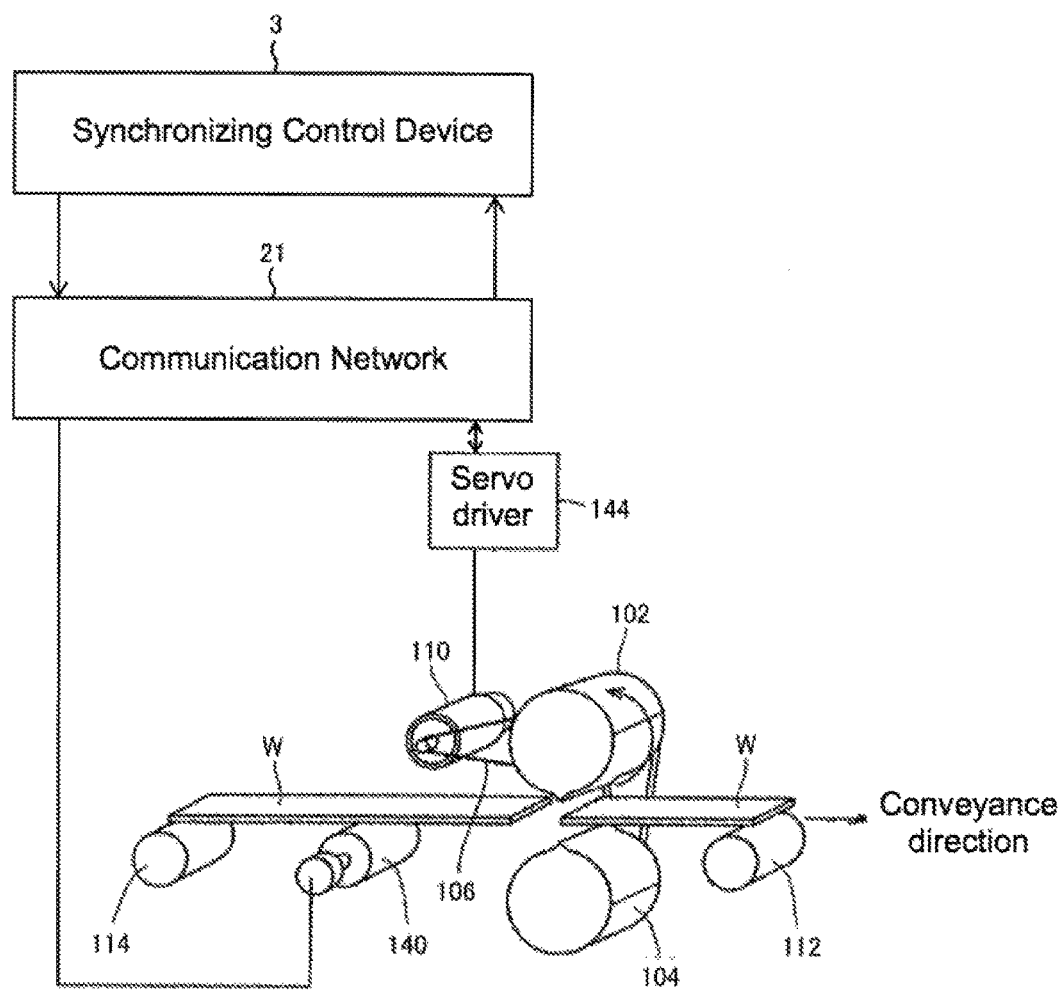
FIG. 6 is a block diagram illustrating a yet another configuration of the first axis system and the second axis system in the first embodiment.

The first and second axis systems may be configured as illustrated in FIG. 6 in the motion control system 1 according to the first embodiment. Namely, the first axis system contains workpieces W that are moving parallel, conveyor motors 112, 114 for moving the workpieces, and a measuring roll 140 (first axis) for measuring the position information for the workpieces W. The second axis system contains rotary cutters 102, 104 that rotate, a servo motor 110 (second axis) that uses a belt to rotate the rotary cutters 102, 104 in sync, and a servo driver 144 that drives the servo motor 110. The rotary cutters 102, 104 are rotated in sync and use a blade formed on one portion on the periphery thereof to cut the workpiece W.

The first axis position information (rotation angle) detected by the measuring role 140, and the second axis position information (rotation angle) from the servo motor 110 are entered in the processor 5 in the synchronizing control device 3 (refer to FIG. 2) via the communication network 21. The processing performed by the processor 5 is as above described.

Second Embodiment

The second embodiment compensates for the synchronization lag due to the delay on the first axis (T1+T2), and the synchronization lag due to the delay on the second axis (T3+T4) collectively.

Figure 7:
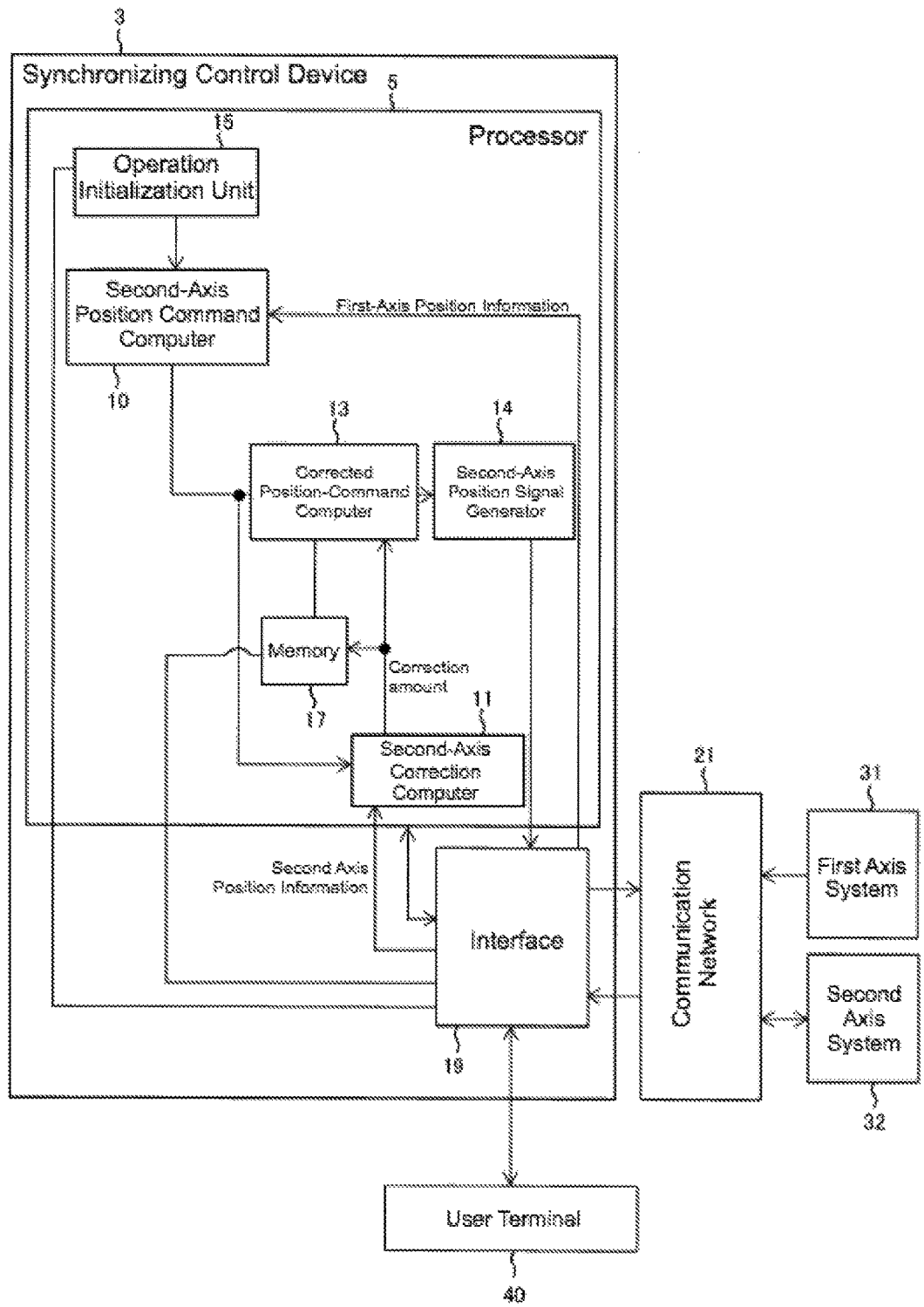
FIG. 7 is a block diagram illustrating a configuration of the motion control system according to a second embodiment.

As illustrated in FIG. 7, the processor 5 in the synchronizing control device 3 according to the second embodiment contains a memory 17, and also includes: a second-axis position-command computer 10, a second-axis correction computer 11, a corrected position-command computer 13, a second-axis position signal generator 14, and an operation initialization unit 15 as function blocks. The first axis system 31 and the second axis system 32 are connected to the processor 5 via the communication network 21 and the interface 19; the user terminal 40 is connected to the processor 5 by the interface 19.

The first axis system 31 transmits first-axis position information to the second-axis position-command computer 10 via the communication network 21 and the interface 19. The second axis system 32 transmits second-axis position information to the second-axis correction computer 11 via the communication network 21 and the interface 19.

The second-axis position-command computer 10 uses the time T1 and the time T2, and the first-axis position information to compute a second-axis position command Here, the second-axis position command is computed after the first axis position is advanced by the travel distance of the first axis during T1+T2. The first-axis shift amount may be computed using the aforementioned Formula 1 and Formula 2. The synchronization lag due to the delay on the first axis (T1+T2) can be compensated for in this manner.

The second-axis correction computer 11 uses the second-axis position command, the time T3 and time T4, and the first-axis position information and the second-axis position information to compute a correction amount (i.e., the travel distance of the second axis during T3+T4). For instance, the second-axis position command may be computed using the aforementioned Formula 3; further, the second-axis correction amount may be computed using the aforementioned Formula 4 or Formula 5.

The corrected position-command computer 13 back tracks the second-axis position command by the correction amount, setting that position as the corrected position command; the corrected position-command computer 13 inputs the corrected position command into the second-axis position signal generator 14, and notifies the memory 17 and the user program on the user terminal 40 with the correction amount and the corrected position command.

The second-axis position signal generator 14 uses the corrected position command and the second-axis position information to generate a second-axis position signal.

Here, when the second-axis position signal is less than the maximum speed on the second axis, this second-axis position signal is entered (transmitted) to the second axis system 32 via the interface 19 and the communication network 21. The second-axis position signal is reflected in the second axis system a time T4 (the delay time on the second axis) after entering the second axis system 32.

When the speed based on the second-axis position signal exceeds the maximum speed of the second axis, the processor further determines whether or not the residual travel distance that remains even when the second axis travels at the maximum speed is within a defined amount; if within the defined amount the processor resets the second-axis position signal to a value based on the maximum speed and inputs the value into the second axis system 32. In this case the residual travel distance is forwarded to a subsequent cycle. Note that if the residual travel distance is a defined amount or greater, the processor determines that there was a malfunction and stops the operation on the second axis system 32.

Thus, the processor back tracks the second-axis position command by the correction amount to compute the corrected position command, and the synchronizing control device compensates for the synchronization lag due to the delay on the second axis (T3+T4) in this manner by inputting a second-axis position signal based on the corrected position command into the second axis system 32.

When a synchronization operation starts, the operation initialization unit 15 determines whether the second axis system 32 should operate using the most recent corrected position command, or should operate using the most recent uncorrected second-axis position command in accordance with a default setting or user input.

The operation initialization unit 15 further determines which positioned command is being used by the second axis system when the second axis system 32 begins operations; if there is a malfunction the operation initialization unit 15 provides external notification to that effect and does not initiate operation of the second axis system 32. Finally the operation initialization unit 15 resets the correction amount stored in the memory 17 to zero when the second axis system 32 starts operations besides synchronizing with the first axis system 31.

Figure 8:
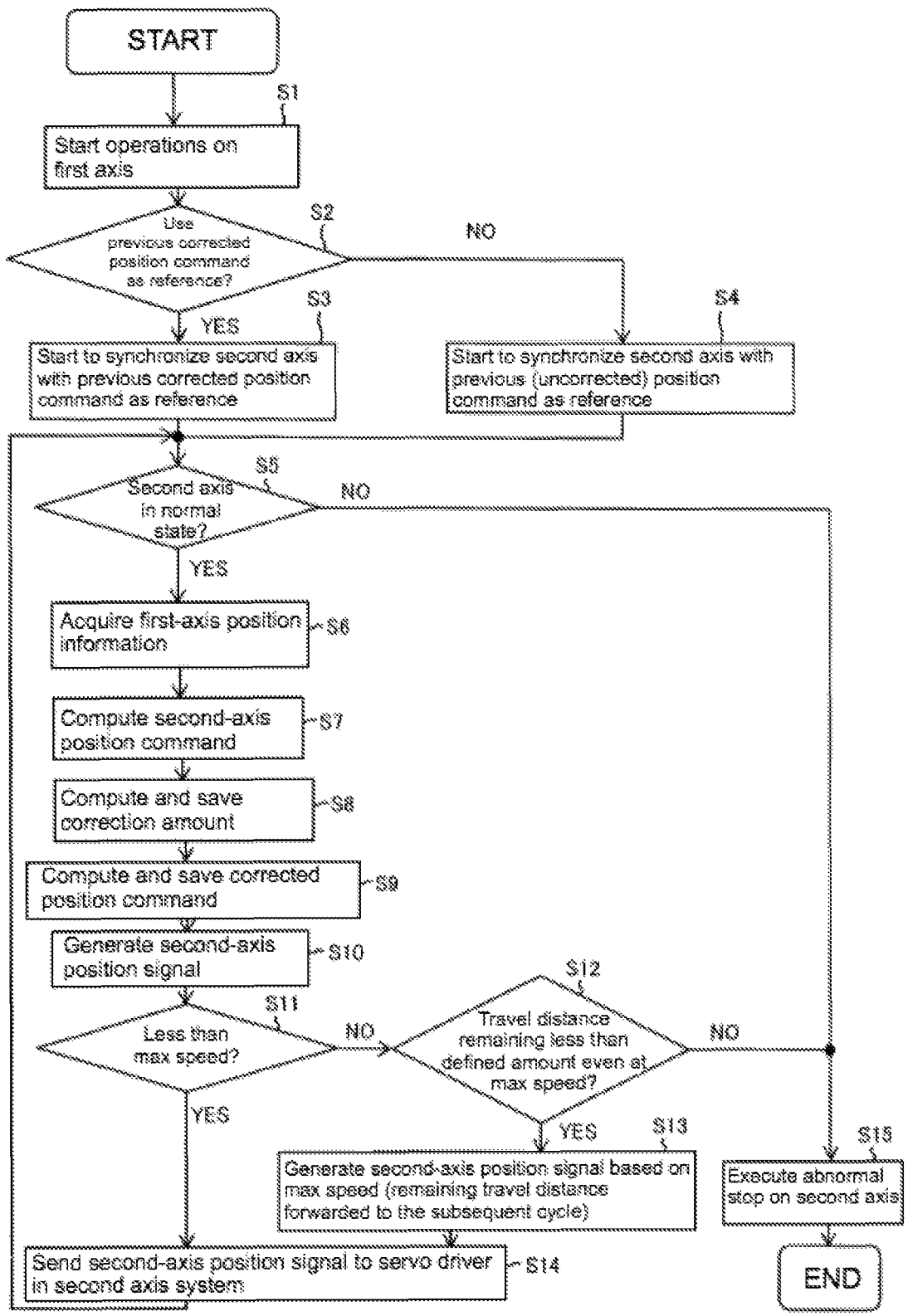
FIG. 8 is a flowchart illustrating the processing steps executed in the processor in FIG. 7.

The flow chart in FIG. 8 illustrates the processing steps executed in the above-described processor 5.

First, the processor starts operations on the first axis in step S1; in step S2 the processor determines whether or not the operation of the second axis system 32 should be executed based on the most recent corrected position command. If YES in step S2, the processor starts operations on the second axis based on the most recent corrected position command (step S3). If NO in step S2, the processor starts operations on the second axis based on the most recent uncorrected position command (step S4).

Control proceeds to step S5, and the processor determines whether or not the second axis is in a normal state. If NO at step S5, control proceeds to step S15 and the second axis is placed in an abnormal stop (END). If YES at step S5, the processor acquires the first-axis position information (step S6).

Next, the processor computes the second-axis position command (step S7). The processor then computes and saves the correction amount (step S8). The processor then computes and saves the corrected position command (step S9).

Subsequently the processor generates a second-axis position signal (step S10). Next, the processor determines whether or not the maximum speed based is exceeded in step S11, if the determination is YES at step S11, the processor sends the second-axis position signal to the servo driver on the second axis (S14). If NO at S11, the processor further determines whether or not the excess travel distance is less than a defined amount (step S13). If NO at step S12, control proceeds to step S15 and the second axis is placed in an abnormal stop (END). If YES at step S12, control proceeds to step S13 where the processor resets the second-axis position signal to a value based on the maximum speed (with the excess travel distance forwarded to the subsequent cycle), and sends the reset second-axis position signal to the servo driver in the second axis system (step S14).

Figure 5B:
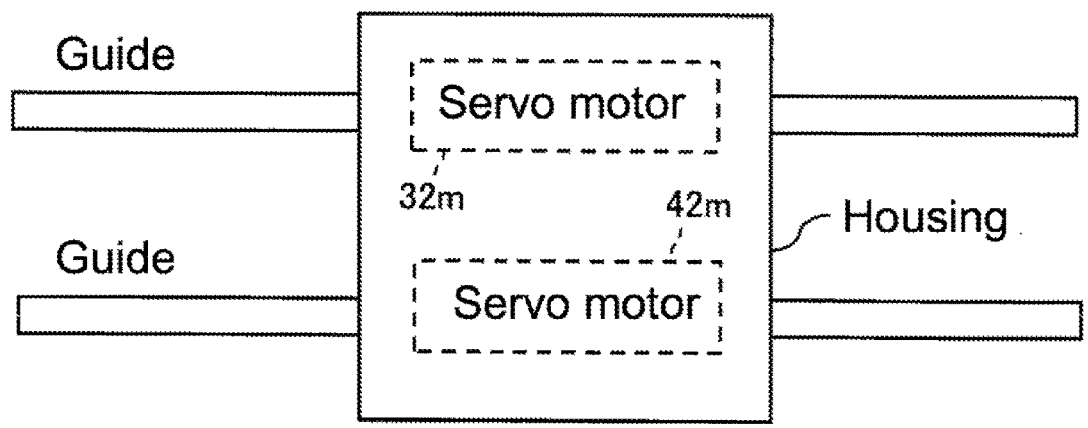
FIG. 5B is a schematic diagram of a gantry mechanism related to the block diagram in FIG. 5A.

Note that in the second embodiment the first axis system and the second axis system may be configured as illustrated in FIGS. 5A and 5B or FIG. 6.

Third Embodiment

Figure 9A:
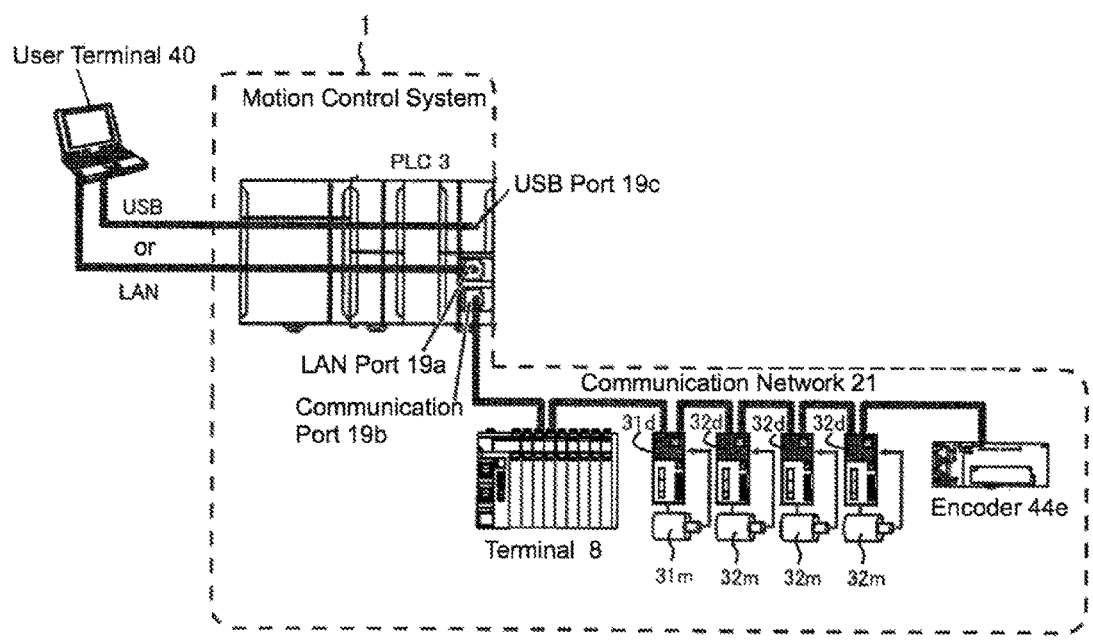
FIGS. 9A and 9B are schematic diagrams illustrating a motion control system according to a third embodiment.

As illustrated in FIG. 9A, a motion control system 1 according to the third embodiment is provided with a programmable logic controller (PLC, 3) including a processor (not shown), a communication network 21 e.g., EtherCAT (Registered Trademark) containing a terminal 8, a servo motor 31*m* which is the first axis, and a servo driver 31*d* driving the servo motor 31*m*, three servo motors 32*m* which are second axes, and three servo drivers 32*d* driving the three servo motors 32*m*, and an encoder 44*e*.

Here, the communication port 19*b* of the PLC 3 is connected to the terminal 8 on the communication network 21, and the USB port 19*c* or the LAN port 19*a* of the PLC 3 is connected to the user terminal 40 (information processing device); the encoder 44*e* sends the PLC 3 the position information and the like for the servo motors 31*m*, 32*m* which are the first and second axes respectively via the communication network 21.

Figure 9B:
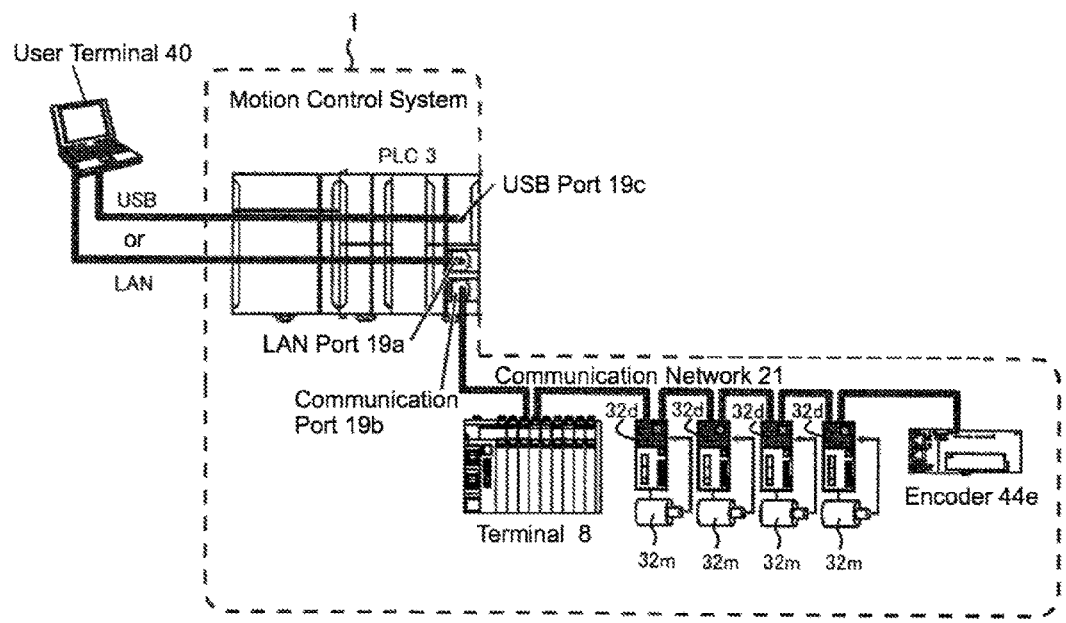

Note that the processing in the processor of the PLC 3 is identical to the processing carried out by the processor 5 exemplified in the first and second embodiments. The processor in the PLC 3 may create a virtual first axis; in this case, the configuration providing four servo motors 32*m* as second axes is also possible as illustrated in FIG. 9B.

As above described the control device synchronizes a second axis to a first axis; the control device is provided with a processor configured to use position information for the first axis to compute a position command for the second axis, and to correct the position command when outputting the position command to the second axis to compensate for a delay caused by the transmission of the position command from the control device to the second axis and a delay on the second axis.

In another configuration the processor corrects the position command using the position command, position information for the second axis, a transmission time which is the time required for transmission of the output, and the delay time on the second axis.

The control device may further include a memory for storing a correction amount related to the correction of the position command, and a corrected position command Additionally, the second axis may be configured to stay at the most recent corrected position command, when output from the processor is forcibly terminated.

In another configuration, the control device selects from correcting the position command with reference to the most recent corrected position command or correcting the position command with reference to the most recent uncorrected position command when output is restarted after forcible termination thereof.

In another configuration, the processor resets the correction amount stored in the memory to zero when executing operations other than operations to synchronize the second axis with the first axis.

In another configuration the processor carries out a correction using a computation formula including the position command and the position information for the second axis as parameters.

In another configuration of the control device, the processor references a table defining the relationship between the position information for the second axis and a correction amount when the delay time on the second axis differs due to the second axis position.

In another configuration, when the position information for the second axis is not described in a table defining the relationship between the position information for the second axis and a correction amount, the processor uses linear interpolation or curve interpolation to compute a correction amount when correcting the position command.

In another configuration of the control device, the processor notifies a user program of the correction amount when correcting a position command.

In another configuration of the control device, the output from the processor is a signal representing the position command for the second axis. When the speed of the second axis based on the position command is greater than the maximum speed of the second axis, the processor sets the position command based on the maximum speed, and taking into account travel of the second axis at the maximum speed, forwards the travel distance remaining to a subsequent correction.

In another configuration of the control device, the processor halts operations on the second axis assuming there is a malfunction when the travel distance remaining when the second axis travels at the maximum speed exceeds a fixed amount.

In another configuration of the control device, the first axis and the second axis are each connected to the processor via a network, and the processor shifts the position of the first axis virtually to compensate for the synchronization lag generated due to the time needed for position information for the first axis to be entered in the processor via the network, and the time needed from the processor receives the position information for the first axis until the processor outputs the position command.

In another configuration of the control device, the first axis and the second axis are each connected to the processor via a network, and the processor corrects the position command to compensate for the synchronization lag generated due to the time needed for position information for the first axis to be entered in the processor via the network, the time needed from the processor receiving the position information for the first axis until the processor outputs the position command, the time needed for the output to be entered into the second axis via the network, and the delay time on the second axis.

A method of synchronizing control involves computing a position command for a second axis using position information for a first axis, and providing an output to the second axis corresponding to the position command, to thereby synchronize the second axis with the first axis; and correcting the position command to compensate for the synchronization lag caused by the transmission of the output, and the delay time on the second axis.

The present invention is not limited to the above described embodiments, and may be modified in various ways and combined as appropriate on the basis of common general knowledge. Any embodiment obtained in such a manner remains within the technical scope of the present invention.

INDUSTRIAL APPLICABILITY

The control device according to the present invention is suitable for a factory automation (FA) device for example.

REFERENCE NUMERALS

1 Motion Control System
3 Synchronizing control device (PLC)
5 Processor
10 Second-Axis Position Command Computer
11 Second-Axis Correction Computer
13 Corrected Position-Command Computer
14 Second-Axis Position Signal Generator
15 Operation Initialization Unit
16 First-Axis Shifting Unit
17 Memory
19 Interface
21 Communication Network
31 First Axis System
31m Servo motor (first axis)
Second Axis System
32m Servo motor (second axis)
40 User Terminal
110 Servo motor (second axis)
140 Measuring roll (first axis)

The invention claimed is:

1. A non-virtual synchronization control device communicatively coupled to a first axis system controlling a first axis and a non-virtual second axis system controlling a second axis, the non-virtual synchronization control device configured to synchronize the second axis with the first axis, the control device comprising a processor configured with a program to perform operations comprising:
   acquiring position information for the first axis from the first axis system;
   computing a shifted first axis position based on the position information for the first axis and a first delay comprising a transmission time to acquire the position information for the first axis by the non-virtual synchronization control device and a processing time of processing the position information for the first axis by the processor of the non-virtual synchronization control device;
   computing a position command for the second axis based on the shifted first axis position and the position information for the first axis, the position command for the second axis compensating for the first delay;
   computing a correction amount for the position command for the second axis based on a second delay, the second delay comprising a transmission time for transmitting the position command for the second axis from the non-virtual synchronization control device to the non-virtual second axis system and a response time of the non-virtual second axis system to respond to the position command for the second axis by setting a position of the second axis;
   computing a corrected position command for the second axis based on the correction amount, the corrected position command for the second axis compensating for the second delay; and
   transmitting the corrected position command for the second axis to the non-virtual second axis system,
   wherein the compensating for the first delay and the second delay compensates for synchronization lag between the first axis and the second axis and increases a precision with which the second axis is synchronized with the first axis.

2. The non-virtual synchronization control device according to claim 1, wherein computing the correction amount for the position command for the second axis based on the second delay comprises computing the correction amount based on position information for the second axis and the second delay.

3. The non-virtual synchronization control device according to claim 2, wherein computing the correction amount for the position command for the second axis based on the second delay comprises computing the correction amount for the position command for the second axis based on the position command for the second axis and the position information for the second axis.

4. The non-virtual synchronization control device according to claim 1, further comprising: a memory that stores the correction amount for the position command for the second axis, and the corrected position command for the second axis, wherein
   when operation of the processor is terminated, the second axis stays at a position corresponding to a most recent corrected position command for the second axis.

5. The non-virtual synchronization control device according to claim 4, wherein the processor is further configured with the program to perform operations, when operation of the processor is restarted after termination, comprising one of:
   computing the corrected position command for the second axis with reference to the most recent corrected position command for the second axis; and
   computing the corrected position command for the second axis with reference to a most recent uncorrected position command for the second axis.

6. The non-virtual synchronization control device according to claim 4, wherein the processor is further configured with the program to perform operations comprising resetting the correction amount for the position command for the second axis stored in the memory to zero when executing operations other than operations to synchronize the second axis with the first axis.

7. The non-virtual synchronization control device according to claim 1, wherein the processor is further configured with the program to perform operations comprising referencing a table defining a relationship between the position information for the second axis and the correction amount for the position command for the second axis when the second delay on the second axis differs due to the second axis position.

8. The non-virtual synchronization control device according to claim 7, wherein when the position information for the second axis is not in the table, the processor is further configured with the program to perform operations comprising using one of linear interpolation or curve interpolation to compute the correction amount for the position command for the second axis for use when computing the corrected position command for the second axis.

9. The non-virtual synchronization control device according to claim 1, wherein the processor is configured with the program to perform operations further comprising notifying a user program of the correction amount for the position command for the second axis and the corrected position command for the second axis.

10. The non-virtual synchronization control device according to claim 1, wherein
the processor, when a speed of the second axis based on the corrected position command for the second axis is greater than a maximum speed of the second axis, is configured with the program to perform operations further comprising:
setting the position command for the second axis based on the maximum speed; and
forwarding a travel distance remaining comprising a difference between the corrected position command for the second axis and the set position command for the second axis based on the maximum speed to the non-virtual second axis system for correcting the position of the second axis in a subsequent correction operation.

11. The non-virtual synchronization control device according to claim 10, wherein the processor is configured with the program to perform operations further comprising halting correction operations on the second axis based on an assumption of a malfunction when the travel distance remaining exceeds a fixed amount.

12. The non-virtual synchronization control device according to claim 1, wherein the first axis system and the non-virtual second axis system are each configured to connect to the processor via a network, and
the processor is further configured with the program to perform operations comprising virtually shifting a position of the first axis to compensate for the synchronization lag between the first axis and the second axis generated due to the first delay.

13. The non-virtual synchronization control device according to claim 1, wherein the first axis system and the non-virtual second axis system are each configured to connect to the processor via a network, and
the processor is further configured with the program to perform operations comprising computing the corrected position command for the second axis to compensate for the synchronization lag between the first axis and the second axis generated due to the first delay and the second delay.

14. A method of synchronizing a first axis system controlling a first axis and a non-virtual second axis system controlling a second axis with a non-virtual synchronization control device communicatively coupled to the first axis system and the non-virtual second axis system, the method comprising:
acquiring, by the non-virtual synchronization control device from the first axis system, position information for the first axis;
computing, by the non-virtual synchronization control device, a shifted first axis position based on the position information for the first axis and a first delay comprising a transmission time to acquire the position information for the first axis by the non-virtual synchronization control device and a processing time of processing the position information for the first axis by the non-virtual synchronization control device;
computing, with the non-virtual synchronization control device, a position command for the second axis based on the shifted first axis position and the position information for the first axis, the position command for the second axis compensating for the first delay;
computing, with the non-virtual synchronization control device, a correction amount for the position command for the second axis based on a second delay, the second delay comprising a transmission time for transmitting the position command for the second axis from the non-virtual synchronization control device to the non-virtual second axis system and a response time of the non-virtual second axis system to respond to the position command for the second axis by setting a position of the second axis;
computing a corrected position command for the second axis based on the correction amount, the corrected position command for the second axis compensating for the second delay; and
transmitting, from the non-virtual synchronization control device, the corrected position command for the second axis to the non-virtual second axis system,
wherein the compensating for the first delay and the second delay compensates for synchronization lag between the first axis and the second axis and increases a precision with which the second axis is synchronized with the first axis.

15. The method according to claim 14, wherein computing, with the non-virtual synchronization control device, the correction amount for the position command for the second axis based on the second delay comprises computing the correction amount based on position information for the second axis and the second delay.

16. The method according to claim 14, further comprising:
storing, in a memory, the correction amount for the position command for the second axis and the corrected position command for the second axis, wherein
when operation of the non-virtual synchronization control device is terminated, the second axis stays at a position corresponding to a most recent corrected position command for the second axis.

17. The method according to claim 16, further comprising:
performing, with the non-virtual synchronization control device, when operation of the non-virtual synchronization control device is restarted after being terminated, one of:
computing, with the non-virtual synchronization control device, the corrected position command for the second axis with reference to the most recent corrected position command for the second axis; and
computing, with the non-virtual synchronization control device, the corrected position command for the second axis with reference to a most recent uncorrected position command for the second axis.

18. The method according to claim 16, further comprising resetting, with the non-virtual synchronization control device, the correction amount for the position command for the second axis stored in the memory to zero when the non-virtual synchronization control device performs operation other than operations to synchronize the second axis with the first axis.

19. The method according to claim 14, further comprising:
- setting, with the non-virtual synchronization control device, when a speed of the second axis based on the corrected position command for the second axis is greater than a maximum speed of the second axis, a corrected position command for the second axis based on the maximum speed; and
- forwarding, with the non-virtual synchronization control device, a travel distance remaining comprising a difference between the corrected position command for the second axis and the set position command for the second axis based on the maximum speed to the non-virtual second axis system for correcting the position of the second axis in a subsequent correction operation.

20. The method according to claim 19, further comprising halting, with the non-virtual synchronization control device, correction operations on the second axis based on an assumption of a malfunction when the travel distance remaining exceeds a fixed amount.

* * * * *